(12) United States Patent
Kim et al.

(10) Patent No.: US 10,001,866 B2
(45) Date of Patent: Jun. 19, 2018

(54) METHOD OF OPERATING TOUCH MODULE AND ELECTRONIC DEVICE SUPPORTING SAME

(71) Applicant: Samsung Electronics Co., Ltd., Gyeonggi-do (KR)

(72) Inventors: Jin Man Kim, Gyeongsangbuk-do (KR); Hee Kon Kim, Daegu (KR); Sung Bin An, Gyeongsangbuk-do (KR); Jung Sik Choi, Gyeongsanbuk-do (KR)

(73) Assignee: Samsung Electronics Co., Ltd. (KR)

( * ) Notice: Subject to any disclaimer, the term of this patent is extended or adjusted under 35 U.S.C. 154(b) by 105 days.

(21) Appl. No.: 14/594,686

(22) Filed: Jan. 12, 2015

(65) Prior Publication Data

US 2015/0212642 A1 Jul. 30, 2015

(30) Foreign Application Priority Data

Jan. 24, 2014 (KR) .................... 10-2014-0009004

(51) Int. Cl.
*G06F 3/041* (2006.01)
*H04B 1/3827* (2015.01)

(52) U.S. Cl.
CPC ......... *G06F 3/0416* (2013.01); *H04B 1/3838* (2013.01)

(58) Field of Classification Search
CPC ..................... H04B 1/3838; G06F 3/0416
See application file for complete search history.

(56) References Cited

U.S. PATENT DOCUMENTS

| | | | |
|---|---|---|---|
| 8,385,885 | B2 | 2/2013 | Hainzl |
| 9,323,366 | B2 | 4/2016 | Chien |
| 9,465,460 | B2 | 10/2016 | Chien et al. |
| 2010/0099394 | A1* | 4/2010 | Hainzl ............... G06F 1/32 |
| | | | 455/418 |
| 2011/0205191 | A1 | 8/2011 | Hou et al. |
| 2012/0142393 | A1* | 6/2012 | Won ............... H04W 52/246 |
| | | | 455/522 |
| 2013/0027361 | A1 | 1/2013 | Perski et al. |
| 2013/0244731 | A1 | 9/2013 | Oishi et al. |

(Continued)

FOREIGN PATENT DOCUMENTS

| | | |
|---|---|---|
| CN | 101685366 | 3/2010 |
| CN | 103425334 | 12/2013 |
| CN | 103425335 | 12/2013 |

OTHER PUBLICATIONS

International Search Report dated Mar. 30, 2015 issued in counterpart application No. PCT/KR2015/000394.

(Continued)

*Primary Examiner* — Dennis Joseph
(74) *Attorney, Agent, or Firm* — The Farrell Law Firm, P.C.

(57) ABSTRACT

Methods and apparatuses are provided for operating a touch module of an electronic device. A communication related event is received at the electronic device. The touch module is switched from operation at a first operating frequency to operation at a second operating frequency, upon reception of the communication related event. The first operating frequency enables the touch module to receive a touch input. The second operating frequency enables the touch module to detect a specified event.

19 Claims, 6 Drawing Sheets

(56) References Cited

U.S. PATENT DOCUMENTS

| | | |
|---|---|---|
| 2013/0300668 A1 | 11/2013 | Churikov et al. |
| 2013/0314349 A1 | 11/2013 | Chien et al. |
| 2013/0315419 A1* | 11/2013 | Chien .................. H03G 7/00 381/98 |
| 2013/0335319 A1 | 12/2013 | Balasundaram et al. |
| 2014/0022203 A1 | 1/2014 | Karpin et al. |

OTHER PUBLICATIONS

Chinese Office Action dated Nov. 3, 2017 issued in counterpart application No. 201580005714.4, 23 pages.

* cited by examiner

METHOD OF OPERATING TOUCH MODULE AND ELECTRONIC DEVICE SUPPORTING SAME

PRIORITY

This application claims priority under 35 U.S.C. § 119(a) to Korean patent Application No. 10-2014-0009004 filed Jan. 24, 2014, the content of which is incorporated herein by reference.

BACKGROUND OF THE INVENTION

1. Field of the Invention

The present invention relates generally to operation of a touch module of an electronic device, and more particularly, to a method for decreasing a Specific Absorption Rate (SAR) in the operation of a touch module.

2. Background of the Invention

Many electronic devices utilize a touch function as an input unit so that user input may be easily accepted.

Typical electronic devices emit electromagnetic waves to support a communication function. These electromagnetic waves may adversely affect the human body.

SUMMARY

The present invention has been made to address at least the above problems and/or disadvantages and to provide at least the advantages described below. Accordingly, an aspect of the present invention provides a method of operating a touch module and an electronic device supporting the same that may adaptively perform a SAR decrease function According to an embodiment of the present invention, an electronic device is provided that includes a memory and a processor coupled to the memory. The processor is configured to supply a first operating frequency to a touch module of the electronic device, and to supply a second operating frequency to the touch module, instead of the first operating frequency, upon reception of a communication related event at the electronic device. The first operating frequency enables the touch module to receive a touch input, and the second operating frequency enables the touch module to detect a specified event.

According to another embodiment of the present invention, a method is provided for operating a touch module of an electronic device. A communication related event is received at the electronic device. The touch module is switched from operation at a first operating frequency to operation at a second operating frequency, upon reception of the communication related event. The first operating frequency enables the touch module to receive a touch input. The second operating frequency enables the touch module to detect a specified event.

An article of manufacture is provided for operating a touch module of an electronic device, and includes a machine readable medium containing one or more programs which when executed implement the steps of: receiving a communication related event at the electronic device; and switching the touch module from operation at a first operating frequency to operation at a second operating frequency, upon reception of the communication related event. The first operating frequency enables the touch module to receive a touch input. The second operating frequency enables the touch module to detect a specified event.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
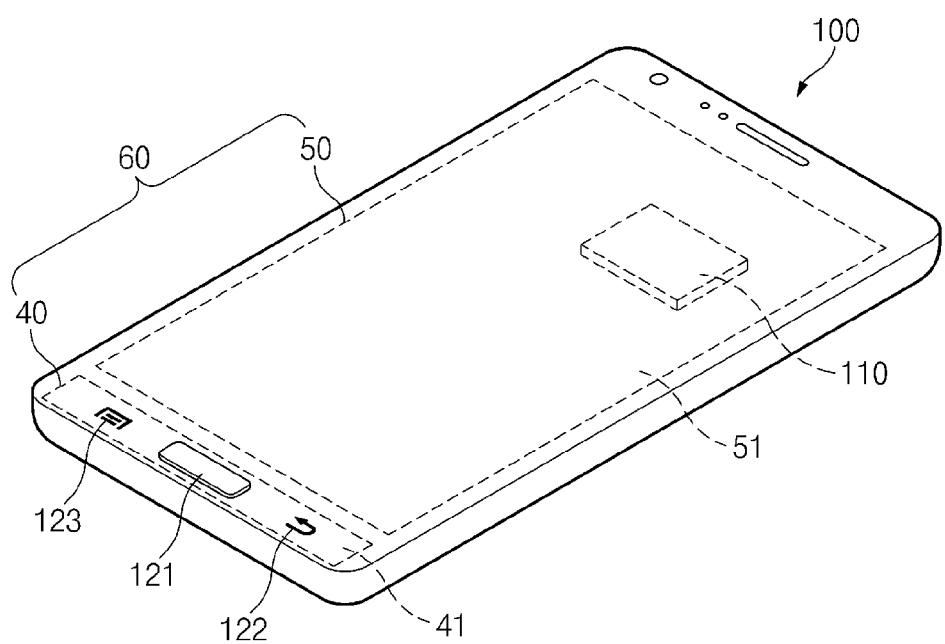
FIG. 1 is a diagram illustrating an electronic device, according to an embodiment of the present invention.

Embodiments of the present disclosure are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The expressions "include" or "may include" that may be used in describing the embodiments of the present invention indicate the presence of a disclosed corresponding function, operation, and/or component but does not exclude one or more additional functions, operations, or components. Furthermore, in describing the embodiments of the present invention, it should be understood that the terms "includes" or "has" indicate the presence of characteristics, numbers, steps, operations, components, parts, or combinations thereof represented in the present disclosure but do not exclude the presence or addition of one or more other characteristics, numbers, steps, operations, components, parts, or combinations thereof.

In describing various embodiment of the present invention, the expression "or" includes any and all combinations of enumerated words. For example, the expression "A or B" may include A, B, or both A and B.

In describing various embodiments of the present invention, the expression "a first", "a second", "firstly", or "secondly" may modify various components in various embodiments of the present invention, but do not limit corresponding components. For example, the expressions above do not limit the order and/or importance of corresponding components. The expressions above may be used to distinguish one component from another component. For example, a first user device and a second user device are all both user devices that may be mutually different user devices. For example, the first component may be named as the second component without departing from the scope of various embodiments of the present invention, and similarly, the second component may also be named as the first component.

When any component is referred to as being "connected to" or "accessed by" another component, it should be understood that the former can be directly connected to the latter, or there may be another component in between. On the contrary, when any component is referred to as being "directly connected to" or "directly accessed by" another component, it should be understood that there may be no other component in between.

The terms used in describing the embodiments of the present invention are used only to describe specific embodiments and are not intended to limit embodiments of the present invention. The terms in singular form include the plural form unless otherwise specified.

Unless otherwise defined, all terms used herein including technical or scientific terms have the same meanings as those generally understood by a person ordinarily skilled in the art. Terms defined in generally used dictionaries should be construed to have meanings matching contextual meanings in the related art, and should not be construed as having an ideal or excessively formal meaning unless otherwise defined in the embodiments of the present invention.

An electronic device, according to embodiments of the present invention, may include a touch module. For example, the electronic device may be embodied as at least one of a smart phone, a tablet Personal Computer (PC), a mobile phone, a video phone, an e-book reader, a desktop PC, a laptop PC, a net book computer, a Personal Digital Assistant (PDA), a Portable Multimedia Player (PMP), an MP3 player, a mobile medical device, a camera, and a wearable device (e.g., a Head-Mounted-Device (HMD) such as electronic glasses, electronic clothing, an electronic bracelet, an electronic necklace, an electronic "appcessory", an electronic tattoo, or a smart watch).

According to an embodiment of the present invention, the electronic device may be a smart home appliance having a communication function and a touch module. The smart home appliance may include, for example, at least one of a TV, a Digital versatile Disc (DVD) player, an audio set, a refrigerator, an air conditioner, a cleaner, an oven, a microwave oven, a washing machine, an air cleaner, a set-top box, a TV box, a game console, an electronic dictionary, an electronic key, a camcorder, and an electronic frame.

According to an embodiment of the present invention, the electronic device may include at least one of various medical devices (e.g., a Magnetic Resonance Angiography (MRA) device, a Magnetic Resonance Imaging (MRI) device, a Computed Tomography (CT) device, a camera, and an ultrasonicator), a navigator, a Global Positioning System (GPS) receiver, an Event Data Recorder (EDR), a Flight Data Recorder (FDR), a car infotainment device, electronic equipment for a ship (e.g., a navigator for a ship or a gyro compass), avionics, a security device, a head unit for a car, an industrial or home robot, a financial institution's Automated Teller Machine (ATM), or a store's Point Of Sales (POS) system.

According to an embodiment of the present invention, the electronic device may include at least one of a portion of a building/structure or furniture including a communication function, an electronic board, an electronic signature receiving device, a projector, and various measurement devices (e.g., water, electricity, gas and electric wave measurement devices). The electronic device, according to an embodiment of the present invention, may be one or more combinations of the above-described various devices. Moreover, an electronic device, according to an embodiment of the present invention, may be a flexible device. Moreover, it is obvious to a person ordinarily skilled in the art that an electronic device, according to an embodiment of the present invention, is not limited to the above-described devices.

FIG. 1 is a diagram illustrating an electronic device, according to an embodiment of the present invention.

Referring to FIG. 1, an electronic device 100 includes a first touch module 40, and a second touch module 50.

The first touch module 40 is arranged on the lower end of a side of the electronic device 100. The second touch module 50 is arranged on the upper end of the first touch module 40. A first touch panel 41, included in the first touch module 40, and a second touch panel 51, included in the second touch module 50, are arranged on a display panel 60. In this embodiment of the present invention, the area of the display panel 60 includes the area of the first touch module 40 and the area of the second touch module 50. Although there is a space between the first touch module 40 and the second touch module 50 in FIG. 1, it may be understood in other embodiments of the present invention that the first touch module 40 and the second touch module 50 are areas without a separator on the display panel 60. A home key 121 and at least one other key 122 and 123 are arranged on the first touch module 40. FIG. 1 illustrates that the at least one other touch key 122 and 123 includes a back key (or a back space key) 122 and a menu key 123. The electronic device 100, according to an embodiment of the present invention, may change the setting of the first touch module 40 to execute an SAR decrease function when a communication related event occurs. For example, the electronic device 100 may change a first operating frequency of the first touch module 40 related to executing a touch function for reception of touch input, to a second operating frequency related to executing the SAR decrease function. When a function performed by a communication related event is released, the electronic device 100 may change the operating frequency of the first touch module 40 to the first operating frequency.

According to an embodiment of the present invention, the electronic device 100 may control a change in the operating frequency of the first touch module 40, by maintaining one of the turn-on or turn-off states of the display panel 60 in the previous state (e.g., turn-on or turn-off state).

According to an embodiment of the present invention, the electronic device 100 may change the operation frequency of the first touch module 40 to the second operating frequency for executing the SAR decrease function, by maintaining the turn-off state of the display panel 60, if the display panel 60 is in a turn-off state and a communication related event occurs. In this process, after activating a touch function that operates at the first operating frequency of the first touch panel 41 of the first touch module 40, the electronic device 100 may enable a touch function that operates at the first operating frequency, to operate at the second operating frequency according to a designated event (e.g., a designated time elapse or a designated touch event). The electronic device 100 may activate the first touch module to execute the SAR decrease function when the first touch module 40 operating at the second operating frequency detects a specified event. For example, the electronic device 100 may control a change in power setting to decrease power supplied to a communication module 110 to a specified value. According to an embodiment of the present invention, power related to the specified event may be less than a power value of the communication module 110. It is possible to include an operation of restoring the power of the communication module 110 to power before the reception of the specified event, when the specified event or the communication related event is released. While detecting an event set to decrease the SAR, the electronic device 100 may continue to supply the second operating frequency so that the first touch module 40 performs a detection function related to executing the SAR decrease function.

According to an embodiment of the present invention, when the electronic device 100 receives a communication related event while the display panel 60 is in a turn-off state, the electronic device 100 may maintain a turn-off state of the display panel 60 for a certain time period. When a certain time period elapses without the detection of the specified event, the electronic device 100 may output a screen according to communication related event reception, allow an input event reception state, or output the screen and allow the input state. For example, the display panel 60 of the electronic device 100 may output a screen that provides a notice of voice call or video call event reception. In this embodiment of the present invention, the display panel 60 may display a virtual key button related to receiving and processing an event. The second touch module 50 may perform a touch function related to a virtual key button operation. The electronic device 100 may process the turn-off state of the display panel 60 to be maintained, when the specified event is detected within a certain time period. In this embodiment of the present invention, the electronic device 100 may allow the first touch module 40 to execute a detection function.

According to an embodiment of the present invention, the electronic device 100 may activate the display panel 60 to display a screen related to communication related event reception without waiting for a certain time period, when receiving a communication related event while the display panel 60 is in a turn-off state. The electronic device 100 may switch the display panel 60 to the turn-off state when a specified event is detected from the first touch module 40 while a specific screen is displayed on the display panel 60.

According to an embodiment of the present invention, the electronic device 100 may maintain the turn-on state of the display panel 60 and activate the first touch module 40 supporting a touch function to be reset (such as, for example, initialization or restoration to a designated state) and operate at the second operating frequency for supporting the SAR decrease function. The electronic device 100 may allow the SAR decrease function to be executed when a specified event related to the SAR decrease function is detected. The electronic device 100 may activate the first touch module 40 to operate at the first operating frequency related to supporting a touch function when the communication related event is ended. The electronic device 100 may allow SAR decrease function application to be released when the communication related event is ended.

According to an embodiment of the present invention, the electronic device 100 may allow an applied SAR decrease function to be released when a specified event is not detected. In this process, the electronic device 100 may activate the first touch module 40 to operate at the second operating frequency related to a detection function until the communication related event is released.

The specified event may include an event that the back key 122 and the menu key 123 are selected together. Also, the specified event may be an event for touching an area equal to or larger than a specified certain size on the touch panel of the first touch panel. Alternatively, the specified event may include a touch event that occurs on at least one of the back key 122 and the menu key 123 several times for a certain time period.

Figure 2:
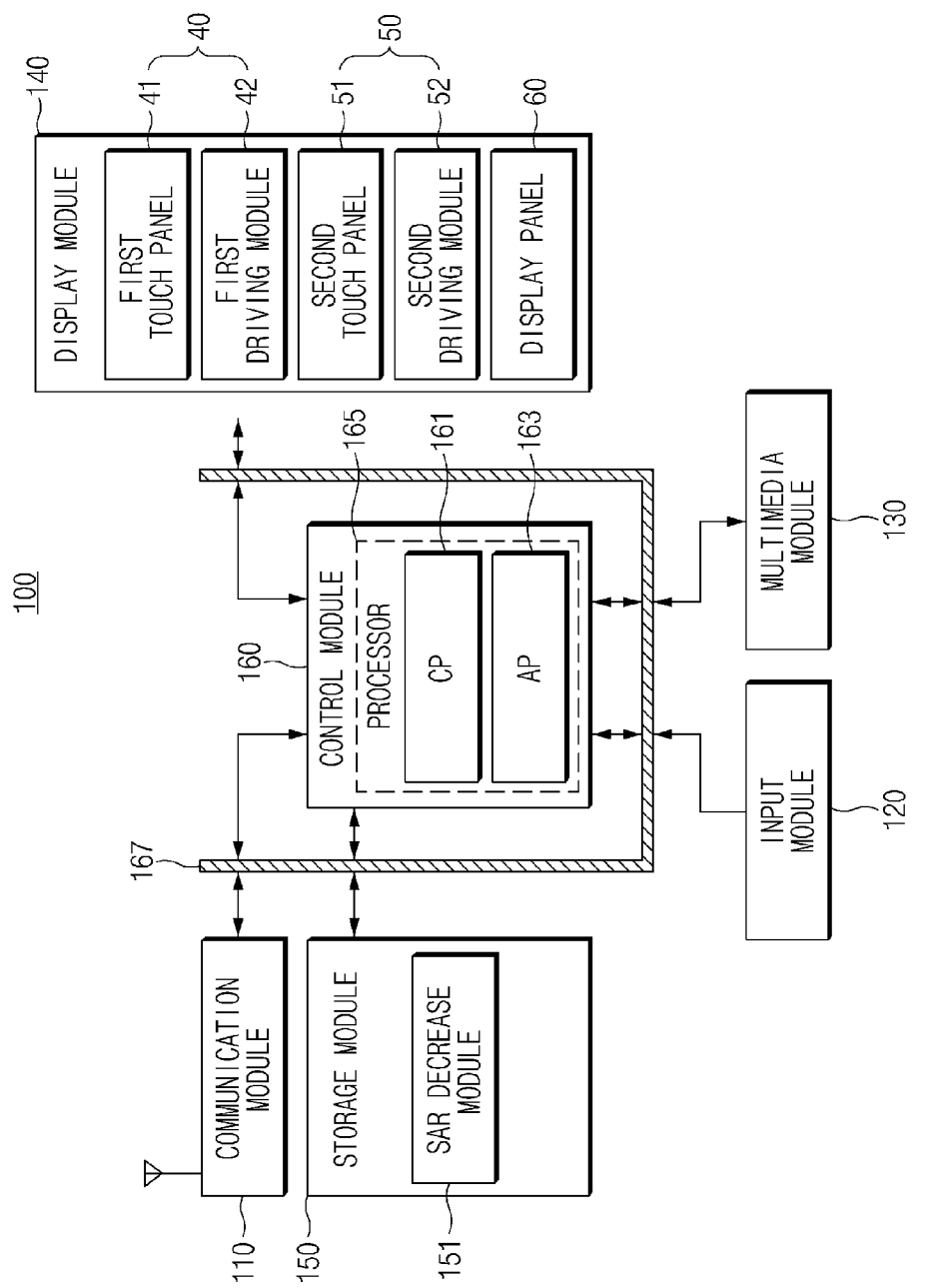
FIG. 2 is a block diagram illustrating an electronic device, according to an embodiment of the present invention.

FIG. 2 is a block diagram illustrating the electronic device, according to an embodiment of the present invention.

Referring to FIG. 2, the electronic device 100 includes the communication module 110, an input module 120, a multi-media module 130, a display module 140, a storage module 150, and a control module 160.

The electronic device 100 may allow the first touch module 40 of the display module 140 to turn (or switch) to a sensor for detecting specified event occurrence related to an SAN decrease. According to an embodiment, the first touch module 40 is a device component arranged on the lower end of the display module 140. For example, as illustrated in FIG. 1, the first touch module 40 is an area adjacent to the home key 121, or an area on which the back key 122 or the menu key 12 is arranged. In this example, the home key 121 may be a button key. The back key 122 and the menu key 123 may be touch keys.

The communication module 110 includes at least one communication unit associated with the communication function of the electronic device 100. For example, the communication module 110 may include various communication units, such as, for example, a mobile communication unit, a broadcast receiving unit, such as a Digital Multimedia Broadcasting (DMB) module or a Digital Video Broadcasting-Handheld (DVB-H) module, a short-range communication unit, such as an Near Field Communication (NFC) module or Zigbee module being a Bluetooth module, and a Wireless Fidelity (Wi-Fi) communication unit. According to an embodiment of the present invention, the communication module 110 may receive a voice call connection request message from another electronic device. The communication module 110 may receive a video call connection request message from another electronic device. Alternatively, the communication module 110 may transmit the voice call connection request message to another electronic device in response to a user request. The communication module 110 may transmit the video call connection request message to another electronic device in response to a user request. The communication module 110 may form a voice call channel or video call channel according to user control. Alternatively, the communication module 110 may form a data communication channel that receives data from another electronic device or a server device.

The communication module 110 may maintain a communication channel according to one of a plurality of power values. For example, the communication module 110 may operate with a first power value before the execution of the SAR decrease function. The communication module 110 may operate with a second power value, which is less than the first power value, after the execution of the SAR decrease function. The second power value may be a power value that satisfies a specified SAR decrease specification and maintains a communication channel that is currently formed. The SAR decrease specification may vary depending on the country or the age. Accordingly, the setting of the second power value may also vary. According to an embodiment of the present invention, the communication module 110 may operate with the second power value when a specified event occurs on the first touch module 40 that operates at the second operating frequency for the SAR decrease function. The communication module 110 may operate with the first power value, when a specified event is not detected on the first touch module 40 operating at the second operating frequency. According to an embodiment of the present invention, the communication module 110 may operate with the second power value until function execution by the communication related event is ended, and after the occurrence of a specified event.

The input module 120 may generate an input signal of the electronic device 100. The input module 120 may include at least one of a key pad, a dome switch, a (static pressure/ capacitive) touch pad, a jog wheel, and a jog switch, for example. The input module 120 may be realized in a button form on the outside of the electronic device 100 and some buttons may also be realized as the display module 140 having a touch function. According to an embodiment of the present invention, the input module 120 may include a plurality of keys for obtaining numeric or text information and setting various functions. Such keys may include a menu call key, a screen ON/OFF key, a power ON/OFF key, a volume control key, and the home key 121 of FIG. 1. According to an embodiment, the home key 121 may be arranged on one side of the display module 140. For example, the home key 121 of FIG. 1 may be arranged on a certain part of an area on which the touch module 40 is arranged. The input module 120 may include the first touch module 40 and the second touch module 50, which generate touch events.

The input module 120 may generate an input signal related to processing a call connection request message received according to the operation of the communication module 110. Also, the input module 120 may generate an input signal for ending a communication related event execution function. The communication related event execution function may also be ended by a request from another electronic device or a server device. The input module 120 may generate an input signal for turning-on the display module 140 or an input signal for turning-off the display module 140. A corresponding input signal may be provided for the control module 160 and may be changed to a set of commands related to the control of a turn-on or turn-off operation.

The multimedia module 130 may process an audio signal of the electronic device 100. For example, the multimedia module 130 may transmit an audio signal input from the control module 160 to a speaker SPK. The multimedia module 130 may perform the function of transferring an audio signal, such as, for example, voice input from a microphone MIC, to the control module 160. The multimedia module 130 may convert an audio signal, such as, for example, the voice input received from the microphone MIC, into a digital signal and transfer the digital signal to the control module 160.

According to an embodiment of the present invention, the multimedia module 130 may make a guidance sound related to communication related event reception or provide sound effect related thereto. For example, when a call connection request message is received, the multimedia module 130 may ring the bell or make a guidance sound, to provide a notice of corresponding request message reception. Also, the multimedia module 130 may also produce vibration that corresponds to the request message reception. The multimedia module 130 may make a guidance sound related to communication channel release or provide sound effect related thereto. According to an embodiment of the present invention, the multimedia module 130 may make a guidance sound or provide a sound effect, to guide a change from a touch function to a detection function related to SAR decrease function execution according to the change of the operating frequency of the first touch module 40. Also, the multimedia module 130 may also make a guidance sound or provide a sound effect, to guide a switch from the detection function to the touch function in response to the change of the operating frequency of the first touch module 40. The function of making a guidance sound or providing a sound effect, as described above, may also be left out according to a user setting or a design change.

The display module 140 may display various screens corresponding to functions processed by the electronic device 100. For example, the display module 140 may display a standby screen, a main screen, or a lock screen. According to an embodiment of the present invention, the display module 140 includes the first touch module 40, the second touch module 50, and the display panel 60. According to an embodiment, the first touch module 40 may be arranged on an area where the touch keys 122 and 123 (of FIG. 1) of the display panel 60 are arranged. The second touch module 50 may be arranged on the upper area of the first touch module 40 arranged on the display panel 60.

The first touch module 40 includes the first touch panel 41 and a first driving module 42.

On the first touch panel 41, a plurality of signal lines may be arranged horizontally and vertically. The first touch panel 41 may provide an area touched according to the first operating frequency that is provided by the first driving module 42. According to an embodiment, the first touch panel 41 may be arranged at the lower end of the display panel 60, such as on an area adjacent to the home key 121 of FIG. 1. On the first touch panel 41, areas for the back key 122 and the menu key 123 of FIG. 1 may be arranged. The first touch panel 41 may provide an area from which a touch, a grip, or pressure is sensed according to the second operating frequency that is provided by the first driving module 42.

The first driving module 42 may regularly supply an operating frequency needed for the operation of the first touch panel 41. According to an embodiment of the present invention, the first driving module 42 may supply the first operating frequency related to touch function support, to the first touch panel 41. The first operating frequency may have a frequency value such as, for example, 60 Hz or 120 Hz. The first driving module 42 may supply the second operating frequency, for event detection function support related to SAR decrease function execution, to the first touch panel 41. The second operating frequency may have a frequency value such as, for example, 1 Hz, 5 Hz, or 7 Hz. The first driving module 42 may transfer a touch event or a specified event occurring on the first touch panel 41, to the control module 160. According to an embodiment of the present invention, the first driving module 42 may supply the first operating frequency or the second operating frequency according to the control of at least one of an Application Processor (AP) module 163 and a Communication Processor (CP) module 161 that are included in the control module 160.

According to an embodiment of the present invention, the first driving module 42 may supply the first operating frequency according to the control of the AP module 163 and then transfer a touch event occurring on the first touch panel 41 to the AP module 163. The first driving module 42 may supply the second operating frequency to the first touch panel 41 according to the control of the AP module 163 when a communication related event occurs. In this embodiment of the present invention, according to the occurrence of the communication related event, the CP module 161 may transfer a corresponding event to the AP module 163.

According to an embodiment of the present invention, when a specified event is detected from the first touch panel 41 operating at the second operating frequency, the first driving module 42 may transfer the specified event to the CP module 161. When specified event detection stops, the first driving module 42 may supply the first operating frequency to the first touch panel 41 according to the control of the CP module 161 or AP module 163. When communication related event function execution is ended, the first driving module 42 may supply the first operating frequency to the first touch panel 41 according to the control of the CP module 161 or AP module 163.

The second touch module 50 includes the second touch panel 51 and a second driving module 52. The second touch module 50 may be activated when the display panel 60 is activated. For example, the second touch module 50 may have a turn-off state when the display 60 is in a turn-off state. The second touch module 50 may have a turn-on state when the display 60 is in a turn-on state. On the second touch panel 51, an effective area may be defined for a virtual key button, a specific icon, or a specific menu item that is displayed on the display panel 60. The second driving module 52 may output a specific operating frequency related to the operation of the second touch panel 51. For example, the second driving module 52 may transmit, to the second touch panel 51, the first operating frequency that is relevant to (e.g., two times), similar to, or equal to the first operating frequency output from the first driving module 42. The display panel 60 may include a backlight unit and a panel area. The panel area may be configured in various forms, according to the characteristics of the display panel 60. For example, the panel area may be configured as a Liquid Crystal Display (LCD). When the panel area is configured as the LCD, the display panel 60 may include the backlight unit. The backlight unit may irradiate light related to pixel realization onto the LCD. When the panel area is in a turn-on state, the backlight unit may have a turn-on state. When the panel area is in a turn-off state, the backlight unit may have a turn-off state. The backlight unit may be provided with, e.g., Light-Emitting Diodes (LEDs).

The display module 140 may support a horizontal-mode screen display and a vertical-mode screen display, according to the rotation direction (or arrangement direction) of the electronic device 100, and a screen change display, according to the change between the horizontal mode and the vertical mode. The display module 140 may include at least one of an LCD, a Thin Film Transistor-LCD (TFT LCD), an LED, an Organic LED (OLED), an Active Matrix OLED (AMOLED), a flexible display, a bent display, and a 3-Dimensional (3D) display. Some of these displays may be realized as transparent displays that are transparent or optically transferable to enable external viewing.

A user input corresponding to a user gesture that occurs on the first touch module 40 is transferred to the control module 160. In this embodiment of the present invention, the user input caused by fingers or a touch unit, such as a touch pen, may include a touch, multiple touches, a tap, double taps, a long tap, tap and touch, drag, a flick, a press, pinch in, and pinch out. Some of the above-described user inputs, such as a multiple touch input, detected on the first touch module 40 may be used as a specified event that detects SAR decrease function execution. Alternatively, the long tap input detected on the first touch module 40 may be defined as a specified event.

The storage module 150 may store various programs and data related to processing and controlling data related to the operation of the electronic device 100. For example, the storage module 150 may store an Operating System (OS). The storage module 150 may store a communication related function such as, for example, a voice call support program, a video call support program, and a data download or upload support program. According to an embodiment of the present invention, the storage module 150 includes an SAR decrease routine 151. The SAR decrease routine 151 may include a routine (a set of commands, phrases, or functions related to the set of commands) that detects a communication related event, a routine that controls the turn-on or turn-off state of the display panel 60, a routine that activates the first touch module 40, and a routine that enables the state of the second touch module 50 to be maintained in the previous state. The SAR decrease routine 151 may include a routine that monitors whether a specified event is detected on the first touch module 40, a routine that requests SAR decrease function execution when the specified event is detected, a routine that request SAR decrease function cancellation when a specified event is not detected, and a routine that requests SAR decrease function cancellation when a communication related event is released.

The above-described storage module 150 may include, as a storage medium, at least one of a flash memory, a hard disk, a micro type memory, a card type memory (for example, Secure Digital (SD) card or eXtreme Digital (XD) card), a Random Access Memory (RAM), a Static RAM (SRAM), a Read-Only Memory (ROM), a Programmable ROM (PROM), an Electrically Erasable PROM (EEPROM), a Magnetic RAM (MRAM), a magnetic disk type memory, and an optical disk type memory. The electronic device 100 may also operate along with a web storage that performs a storage function of the storage module 150 over the Internet.

The control module 160 may process and transfer data related to the operation of the electronic device 100 and process and transfer a control signal. According to an embodiment of the present invention, the control module 160 may control the execution of the function of switching the first touch module 40 to a specified event detection type related to SAR decrease function execution, the function of changing a setting related to an SAR decrease when detecting a specified event according to a detection function, the function of restoring (or cancelling) a changed setting when a specified event is not detected, and the function of restoring the touch function of the first touch module 40 when a communication related event is released or a function execution performed by a communication related event is ended.

The above-described control module 160 includes the CP module 161 and the AP module 163.

The CP module 161 may control the activation of the communication module 110. The CP module 161 may process a communication related event through the activation of the communication module 110, when the event is detected. For example, when a call connection request message is received, the CP module 161 may control a screen display that provides a notice corresponding to request message reception. The CP module 161 may form a call channel with another electronic device when an input event related to a call connection occurs. In this process, the CP module 161 may activate a microphone or activate a camera and the microphone, when there is a request for making a video call.

According to an embodiment of the present invention, the CP module 11 may transfer a communication related event to the AP module 163 when the event occurs. The CP module 161 may receive an alarm for specified event occurrence from the AP module 163. The CP module 161 may change the amplitude of power supplied to the communication module 110 when a specified event occurs. For example, the CP module 161 may change a power setting so that the amplitude of power supplied to the communication module 110 is suitable for a specified SAR decrease specification. The CP module 161 may receive an alarm for specified event detection release from the AP module 163. The CP module 161 may restore a power setting changed for an SAR decrease to original setting when the specified event detection is not detected. The CP module 161 may restore (or cancel) a power setting changed for an SAR decrease when a communication related event is released or a function execution performed by the communication related event is ended.

The AP module 163 may control the activation of the first touch module 40 in response to communication related event occurrence received from the CP module 161. The AP module 163 may control the first touch module 40 performing a touch function so that the first touch module performs an event detection function related to SAR decrease function execution. For example, the AP module 163 may change the operating frequency of the first touch module 40. The AP module 163 may check whether there is a specified event on the first touch module 40 having a detection function. For example, the AP module 163 may check whether the back key 122 and the menu key 123 are touched together on the first touch module 40, performing the detection function. When a specified event occurs, the AP module 163 may transfer the event to the CP module 161. When a specified event is not detected, the AP module 163 may transfer it to the CP module 161. The AP module 163 may return the touch function to the first touch module 40 when communication related event occurrence is released or function execution according to communication related event occurrence is ended.

According to an embodiment of the present invention, the AP module 163 may activate the first touch module 40 to perform the detection function, when the display module 140 receives communication related event occurrence in a turn-off state. The AP module 163 may check whether a specified event occurs on the first touch module 40 performing the detection function. In this process, the AP module 163 may activate the second touch module 50 and maintain a turn-off state of the display panel 60, when a specified event occurs. When a specified event does not occur, the AP module 163 may perform screen processing according to communication related event occurrence.

According to an embodiment of the present invention, the AP module 163 may activate the first touch module 40 having an activated touch function to turn to the detection function, when the display module 140 receives communication related event occurrence in a turn-on state. For example, the AP module 163 may change the first operating frequency supplied to the first touch module 40, and related to touch function support, to the second operating frequency related to the detection function. The AP module 163 may request the CP module 161 to apply an SAR decrease function when a specified event occurs on the first touch module 40. The AP module 163 may request the CP module 161 to restore a setting change related to an SAR decrease, when a specified event is not detected, a communication related event is released, or a function corresponding to a communication related event is ended.

Various embodiments described in the present invention may be implemented in a recording medium that may be read with a computer or a similar device by using software, hardware, or a combination thereof. According to a hardware implementation, the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and other electrical units for performing functions. In some cases, the embodiments of the present invention may be implanted in the control module 160 itself. According to a software implementation, embodiments of the present invention such as procedures and functions may be implemented in separate software modules. Each of the software modules may perform one or more functions and operations described herein.

According to an embodiment of the present invention, the control module 160 of the above-described electronic device 100 includes buses 167 and at least one processor 165. The processor 165 may include the CP module 161 and the AP module 163, for example.

The buses 167 may be circuits that connect components (such as, for example, processors, the storage module 150, the input module 120, the display module 140, and the communication module 110) included in electronic devices and that transfer communication (such as control messages) between the components.

The processor 165 may receive commands through the buses 167 from the components included in the electronic devices, decrypt the received commands, and perform calculation or data processing according to the decrypted commands. The processor 165 executes at least one application stored in the storage module 150 and provides a service based on a corresponding application.

Also, the processor 165 may include one or more APs or one or more CPs. The AP module 163 or the CP module 161 may be included in the processor 165 or they may be included in different IC packages respectively. Also, the AP module 163 or the CP module 161 may also be included in one IC package. The AP module 163 may execute an operating system or application programs to control a plurality of hardware and software components connected to the AP module 163, and may perform processing and calculation on various data, including multimedia data. The AP module 163 may be implanted in a System on Chip (SoC). Also, the CP module 161 may perform at least some of the multimedia control functions. Also, the CP module 161 may use a a SIM card to identify and authenticate terminals in a communication network. The CP module 161 may provide a service including a voice call, a video call, a text message, or a packet data service for a user. Also, the CP module 161 may control the data transmission and reception of the communication module 110. The AP module 163 or the CP module 161 may load, on volatile memories, commands or data received from non-volatile memories connected to the AP module or the CP module, or from at least one other component and may process the commands or data. Also, the AP module 163 or the CP module 161 may store, in non-volatile memories, data received from at least one other component or generated by at least one other component. The CP module 161 may manage a data link when communication is performed between an electronic device, including hardware, and other electronic devices connected through a network, and perform a function of converting a communication protocol. The CP module 161 may be implanted in a SoC. Furthermore, the processor 165 may further include a Graphic Processing Unit (GPU).

Figure 3:
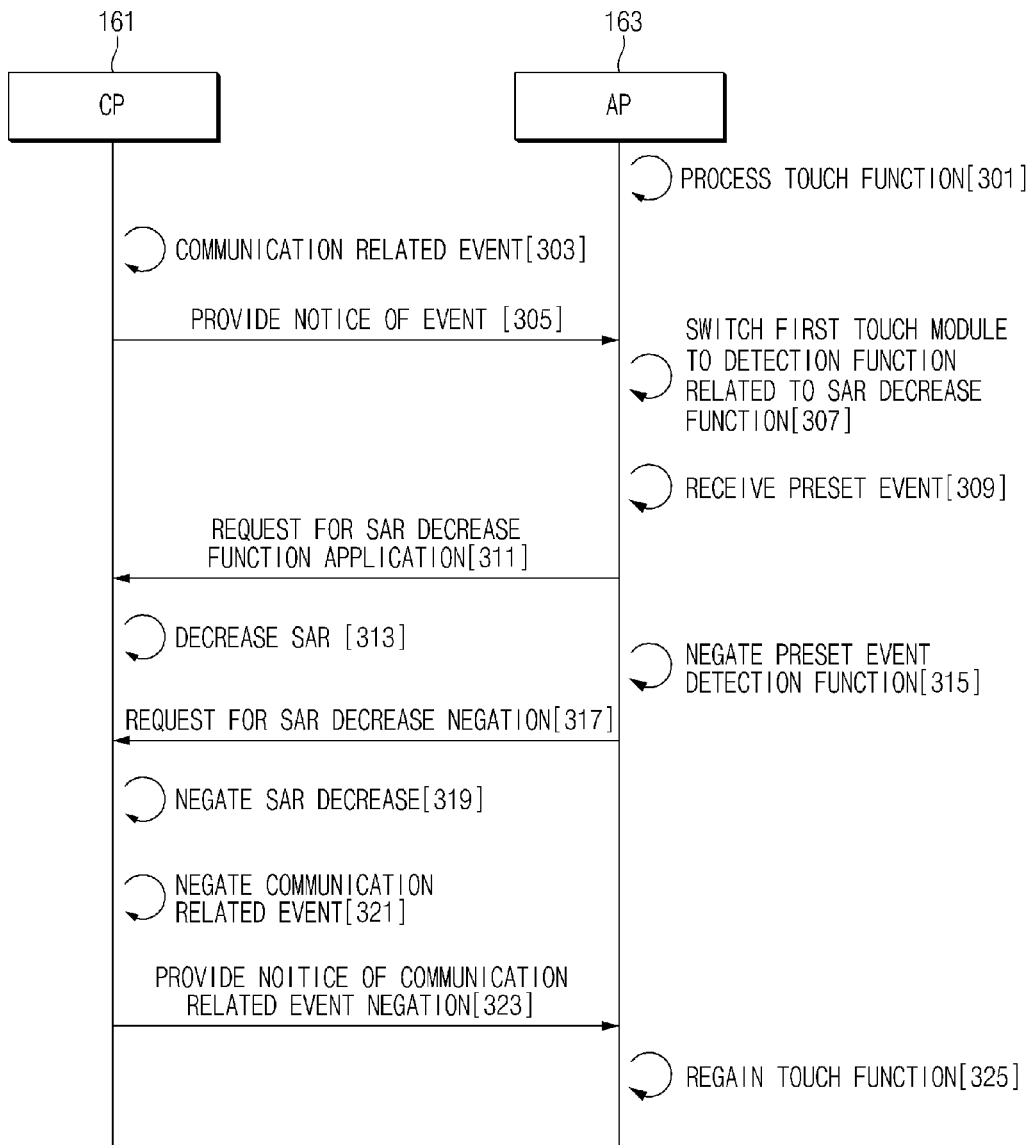
FIG. 3 is a diagram illustrating communication between processors related to touch module operation, according to an embodiment of the present invention.

FIG. 3 is a diagram illustrating communication between processors related to touch module operation, according to an embodiment of the present invention.

Referring to FIG. 3, the AP module 163 processes the touch function of the first touch module 40 of FIG. 2, in step 301. For example, the AP module 163 may activate the first touch module 40 to operate at the first operating frequency. Alternatively, the AP module 163 may activate the first touch module 40 to maintain a turn-off state.

The CP module 161 receives a communication related event, in step 303. The CP module 161 may activate the communication module 110 to a state in which the communication related event may be received. The CP module 161 provides a notice of an event, in step 305, when the communication related event is received. For example, the CP module 161 may transfer a notice of communication related event reception to the AP module 163.

The AP module 163 switches the first touch module 40 to a detection function related to SAR decrease function execution, in step 307, when the notice of the event is received from the CP module 161. According to an embodiment of the present invention, when the first touch module 40 is in a turn-off state, the AP module 163 may transfer an Inter-Integrated Circuit Serial Clock Line (I2C SCL) signal or an Inter-Integrated Circuit Serial Data Line (I2C SDL) signal to the first driving module 42 to control the activation of the first touch module 40. The AP module 163 may control the first driving module 42 so that the first touch panel 41 performs a detection function, when the first touch panel 41 having a touch function is activated by the first driving module 42. For example, the AP module 163 may control a change in the operation frequency of the first driving module 42 so that the first touch module 42 operates at the second operating frequency. In this process, the AP module 163 may transfer an XRES signal so that the first driving module 42 transmits the second operating frequency.

The AP module 163 checks whether a specified event is received from the first touch module 41. When the specified event is received, in step 309, the AP module 163 requests the CP module 161 to apply an SAR decrease function, in step 311. In this process, the AP module 163 may transfer an interrupt signal INT corresponding to specified event occurrence to the CP module 161 to request application of the SAR decrease function.

The CP module 161 performs an SAR decrease, in step 313, when the interrupt signal is received from the AP module 163. For example, the CP module 161 may change power supplied to the communication module 110 to a value corresponding to a specified certain specification. According to an embodiment of the present invention, the CP module 11 may change the power setting of the communication module 110 to a value defined by an SAR specification.

The AP module 163 checks and determines that the specified event is no longer detected, in step 315. The AP module 163 may activate the first touch module 40 to perform a detection function when the communication related event occurs or a function corresponding to the communication related event is performed. When no specified event is detected, the AP module 163 transfers an SAR decrease cancellation request to the CP module 161, in step 317. The CP module 161 performs SAR decrease cancellation, in step 319. For example, the CP module 161 may restore a power setting changed in an SAR decrease process, to an original value. The CP module 161 may change a setting related to the SAR decrease, when the interrupt signal related to applying an SAR decrease function is received from the AP module 163.

The CP module 161 detects communication related event release, in step 321. Alternatively, the CP module 161 may detect the end event of a function being performed in response to the communication related event, in step 321. The CP module 161 transfers a notice of communication related event release to the AP module 163, in step 323.

The AP module 163 regains the touch function, in step 325. For example, the AP module 163 may transfer an XRES signal to the first touch module 40 to turn the detection function to the touch function. The first touch module 40 may change a second operating frequency being transmitted to perform the detection function, according to the XRES signal transferred to the AP module 163, to a first operating frequency related to performing the touch function. According to an embodiment of the present invention, the AP module 163 deactivates the first touch module 40 when the display panel 60 is in a turn-off state before the communication related event occurs.

Although it is described above that one of the detection function or the touch function related to performing the SAR decrease function of the first touch module 40 is performed by the AP module 163, embodiments of the present invention are not limited thereto. For example, the adjustment of the operating frequency of the first touch module 40 may also be performed directly by the control of the CP module 161.

Figure 4:
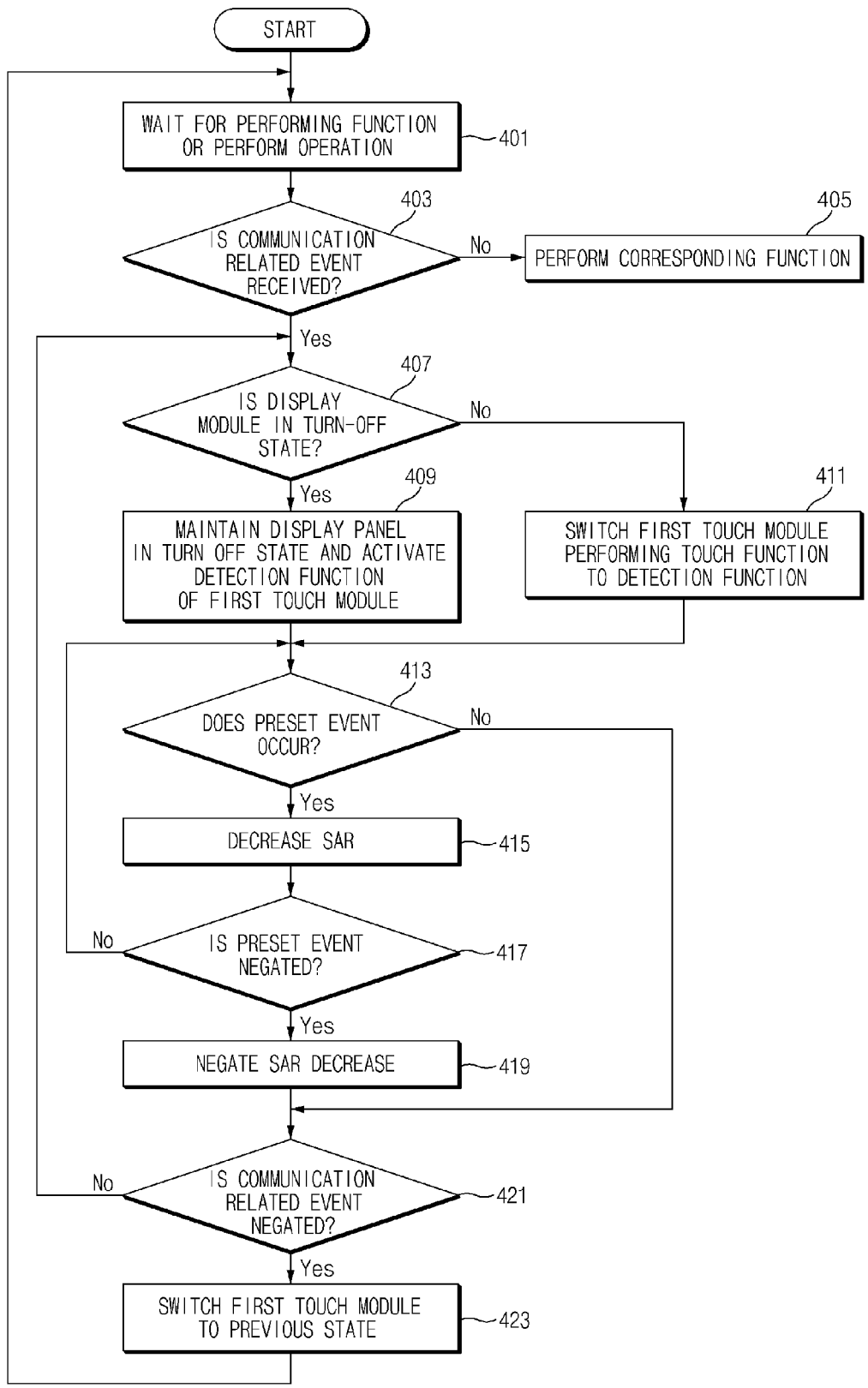
FIG. 4 is a diagram illustrating operation of a touch module by an electronic device, according to an embodiment of the present invention.

FIG. 4 is a diagram illustrating operation of a touch module by an electronic device, according to an embodiment of the present invention.

Referring to FIG. 4, the control module 160 of the electronic device 100 performs an operation or awaits an operation in standby, in step 401. In this process, the control module 160 may display a screen related to a specific function operation on the display panel 60. Also, the control module 160 may activate the second touch module 50 to enable a virtual key button, an icon, or a specific link related to the specific function operation to be selected. Also, the control module 160 may activate the first touch module 40 that performs a touch function in the context of the control of the electronic device 100. The first touch module 40 may operate based on the first operating frequency related to touch function support. According to an embodiment of the present invention, the control module 160 may change the state of display module 140 to a turn-off state when it enters a sleep mode. The control module 160 may maintain the communication module 110 in a communication standby state.

The control module 160 determines whether a communication related event is received, in step 403. When the communication related event is not received, the control module 160 controls a specific function to be performed, in step 405. For example, the control module 160 may continue to operate a function already being performed or activate a new function, in response to an occurred event. Alternatively, the control module 160 may control the display module 40 to maintain a sleep state, i.e., a turn-off state.

When a communication related event is received, the control module 160 determines whether the display module 140 is in a turn-off state, in step 407. When the display module 140 is in turn-off state, the control module 160 activates the detection function of the first touch module 40, maintaining the turn-off state of the display panel 60, in step 409. The control module 160 may activate the first touch panel 41 and then change an operating frequency so that the first touch panel performs a detection function.

When the display module 140 is in a turn-on state, the control module 160 controls the first touch module 40, performing a touch function, to switch to the detection function, in step 411. The control module 160 may reset the first touch module 40 (e.g., initialization or return to a designated value), and then activate the first touch module 40 to operate at a second operating frequency for performing the detection function.

The control module 160 determines whether a specified event occurs on the first touch panel 41, in step 413. When the specified event does not occur, the methodology of the control module 160 proceeds to step 421, which is described in detail below. When the specified event occurs on the first touch panel 41, the control module 160 performs SAR decrease processing, in step 415. For example, the control module 160 may change a power setting of the communication module 110 to enable electromagnetic-wave inhibition defined in an SAR specification. The control module 160 determines whether a specified event is released, in step 417. When there is no specified event release, the methodology of the control module 160 returns to step 413. When the specified event is released, the control module 160 controls SAR decrease cancellation, in step 419. For example, the control module 160 may restore a change in a power setting performed for an SAR decrease, to an original state.

The control module 160 determines whether a communication related event is released, in step 421. When there is no communication related event release, the methodology of the control module 160 returns to step 407. When the communication related event is released, the control module 160 switches the first touch module 40 to the previous state, in step 423. For example, the control module 160 may switch the first touch module 40 to a turn-off state, when the display module 140 is in a turn-off state. The control module 160 may switch the first touch module 40 to a touch function, when the display module 140 is in a turn-on state. The control module 160 may step 423 and then return to step 401.

As described above, the control module 160 may detect a situation in which the specified event occurs on the first touch module 40 in a state in which the communication related event occurs. According to an embodiment of the present invention, when the electronic device 100 is arranged to be in contact with a human body in a state in which the electronic device is in a pocket, the electronic device 100 receiving the communication related event may detect that a specified event, such as, for example, an event touching the back key 122 and the menu key 123 together, is detected on the first touch module 40. When the electronic device in the pocket is in contact with a human body, the control module 160 may perform an SAR decrease so that an electromagnetic wave occurring on the electronic device 100 does not affect the human body.

According to an embodiment of the present invention, when a communication related event occurs while the electronic device 100 operates, it is possible to switch (or turn) the first touch module 40 performing a touch function to a detection function and it is possible to detect the operation of gripping the electronic device 100. The electronic device 100 may inhibit the generation of an electromagnetic wave through an SAR decrease when a grip operation is detected through the first touch module 40.

According to an embodiment of the present invention, when a communication related event occurs while the display module 140 of the electronic device 140 is in a turn-off state, it is possible to operate the first touch module 40 under a detection function, maintaining the display panel 60 in a turn-off state. The control module 160 may perform an SAR decrease function when a specified event occurs on the first touch module 40, and may process the communication related event irrespective of an SAR decrease when the specified event does not occur. Accordingly, the control module 160 may optimize power consumption by maintaining the display panel 60 is in a turn-off state. In this example, when the specified event does not occur within a certain time period, the control module 160 may activate the second touch module 50 and the display panel 60 to receive and process the communication related event. For example, when the electronic device 100 is arranged to be in contact with a human body while the electronic device is in a pocket, the specified event may occur on the first touch module 40 within a certain time period. Cases where the specified event does not occur within the certain time period may mean that the display module 140 may be in a turn-off state and in no contact with a human body, such as in a state in which the electronic device is not gripped. The electronic device 100 may provide a notice of request message reception by appropriately processing the communication related event. When a communication channel is formed in response to the notice of request message reception, the electronic device 100 may activate the first touch module 40 to perform a detection function to apply an SAR decrease function.

As described above, the touch module operation method, according to embodiments of the present invention, may include the operation of receiving a communication related event, and the operation of enabling (or providing, or driving) the touch module operating at a first operating frequency to perform a touch function to operate at a second operating frequency to detect specified event reception.

According to embodiments of the present invention, the method may further include the process of changing the power setting of the communication module 110 to a power setting related to an SAR decrease, when detecting the specified event.

According to embodiments of the present invention, the method may further include the process of restoring a changed power setting related to an SAR decrease when a specified event is not detected or the communication related event is released.

According to embodiments of the present invention, the method may include the process of enabling the first touch module 40 to operate at another operating frequency related to touch event detection, when a specified event is not detected.

According to embodiments of the present invention, the method may include one of the process of enabling the first touch module 40 to operate at another operating frequency related to touch event detection when the communication related event is released, and the process of switching the first touch module 40 to a turn-off state when the communication related event is released.

According to embodiments of the present invention, the method may include the operation of receiving at least one of a voice call connection request message reception event, a video call connection request message reception event, a voice call connection request message transmission event, and a video call connection request transmission event, as a communication related event.

According to embodiments of the present invention, when at least one of an event touching a plurality of touch keys together, an event touching a specified certain area of the touch module, and an event touching at least one touch key several times within a certain time period occurs, the specified event may include the operation of detecting an SAR decrease related event and performing an SAR decrease function.

According to embodiments of the present invention, the method may include the operation of enabling a second operating frequency lower than the first operating frequency.

According to embodiments of the present invention, the method may further include the operation of changing the power of the communication module receiving a communication related event to power related to the specified event, when the specified event is received.

According to embodiments of the present invention, in the method, the power related to the specified event may include a power related to an SAR decrease function execution related event.

According to embodiments of the present invention, power related to the specified event may include a power less than a power value of the communication module.

According to embodiments of the present invention, when the specified event is released or the communication related event is released, the method may further include the operation of restoring the power of the communication module to a power before the reception of the specified event.

According to embodiments of the present invention, the method may further include one of the operation of enabling the touch module to operate at a first operating frequency related to a touch event when the communication related event is released or a function performed by the communication related event is ended, and the operation of switching the touch module to a turn-off state when the communication related event is released or a function performed by the communication related event is ended.

According to embodiments of the present invention, a touch-effective area may include an area recognizing a user touch input.

According to embodiments of the present invention, a touch-ineffective area may include an area not recognizing a user touch input.

Figure 5:
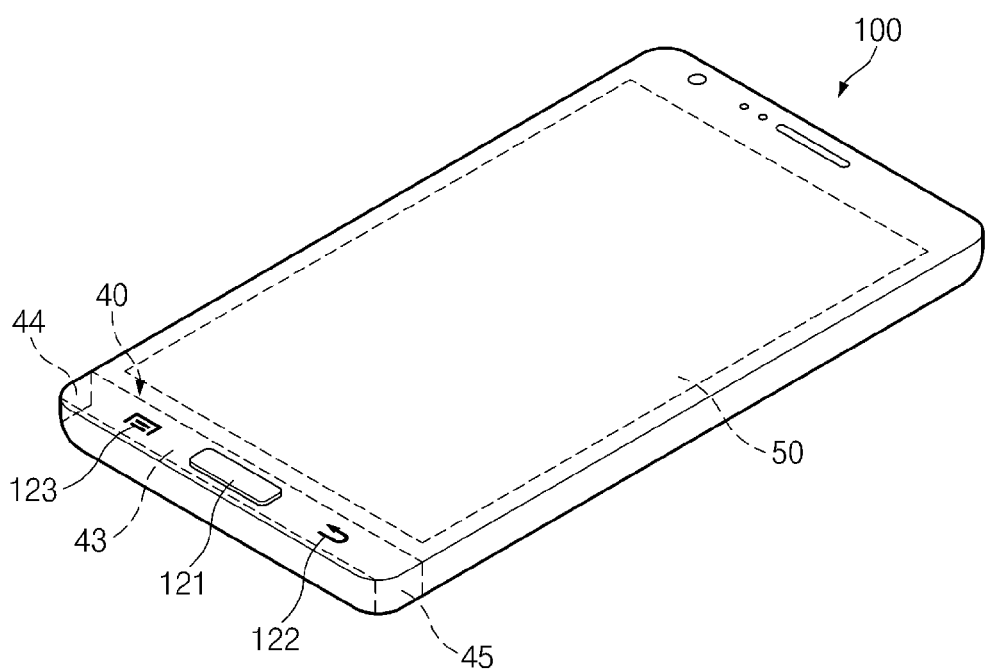
FIG. 5 is a diagram illustrating an electronic device having a first touch module, according to an embodiment of the present invention.

FIG. 5 is a diagram illustrating an electronic device having a first touch module, according to an embodiment of the present invention.

Referring to FIG. 5, the electronic device 100 includes the first touch module 40 and the second touch module 50 having touch areas on the front and side of the electronic device.

The second touch module 50 is arranged on the upper front area of the electronic device 100. The first touch module 40 is arranged on the lower front area of the electronic device 100. The electronic device 100 may include front, rear, and lateral sides, as shown in FIG. 5.

The first touch module 40 includes a front touch area 43, a left touch area 44, and a right touch area 45. The front touch area 43 is horizontally arranged at the lower end of the display panel of the electronic device 100 with a certain thickness. The back key 122 and the menu key 123 are arranged on the front touch area 43. The home key 121 may also be arranged on a certain part of the front touch area 43. The home key 121 may be a button key and may operate independently from the touch event of the front touch area 43.

The left touch area 44 is formed next to the front touch area 43 and is arranged on a certain area of the left side of the electronic device 100. The right touch area 45 is formed next to the front touch area 43 and is arranged on a certain area of the right side of the electronic device 100. When a communication related event occurs, the first touch module 40 performs a detection function and when a plurality of touch events occur together on the left touch area 44, the front touch area 43, and the right touch area 45, the control module 160 may determine that a specified event occurs. For example, the control module 160 may determine that the electronic device 100 is in a grip state. When the specified event occurs, the control module 160 may activate an SAR decrease function.

According to embodiments of the present invention, the control module 160 may deactivate the left touch area 44 and the right touch area 45 when a communication related event does not occur. Alternatively, the control module 160 may recognize the left touch area 44 and the right touch area 45 as an ineffective area. According to embodiments of the present invention, when a communication related event does not occur, the control module 160 may activate only the back key 122 and the menu key 123 to be recognized as an touch-effective area and remaining areas to be recognized as an ineffective area. Accordingly, the control module 160 may inhibit unnecessary touch event occurrence or processing to be caused by gripping the electronic device 100 in the process of operating the electronic device 100.

When the communication related event occurs, the control module 160 changes the operating frequency of the first touch module 40 to a second operating frequency related to a detection function to expand the touch-effective area. For example, the control module 160 may recognize the left touch area 44, the front touch area 43, and the right touch area 45 as one touch-effective area.

According to embodiments of the present invention, the method may further include the process of recognizing, the front touch area 43, the left touch area 44, and the right touch area 45 as a touch-effective area, when the communication related event is received, and the process of recognizing the left touch area 44 and the right touch area 45 as a touch-ineffective area before the communication related event is received or when the communication related event is released.

According to embodiments of the present invention, the method may include the process of recognizing, the front touch area 43, the left touch area 44, the right touch area 45, a first rear touch area 46 that is formed next to the left touch area 44 and arranged on the rear of the electronic device 100, and a second rear touch area 47 that is formed next to the right touch area 45 and arranged on the rear of the electronic device 100, as a touch-effective area, when the communication related event is received, and the process of recognizing only certain areas of the front touch area 43 as a touch-effective area before the communication related event is not received or when the communication related event is released.

According to embodiments of the present invention, the method may further include the process of providing a notice of communication related event reception when the specified event is not received within a certain time period.

Figure 6:
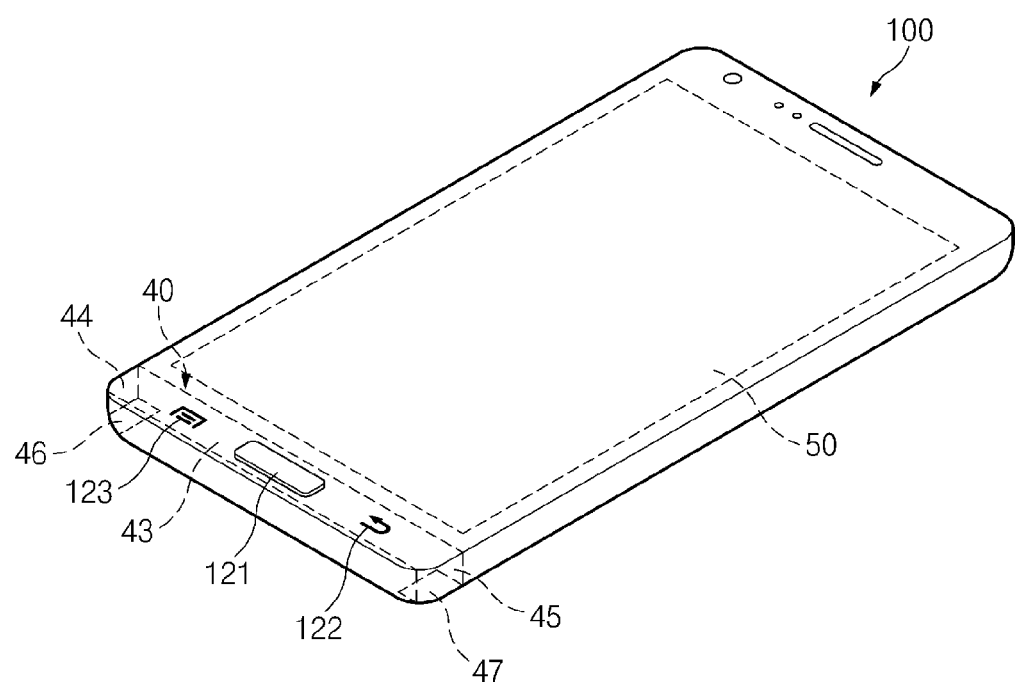
FIG. 6 is a diagram illustrating an electronic device having a first touch module, according to another embodiment of the present invention.

FIG. 6 is a diagram illustrating an electronic device having a first touch module, according to another embodiment of the present invention.

Referring to FIG. 6, the electronic device 100 includes the first touch module 40 and the second touch module 50 having touch areas on the front, side, and rear of the electronic device.

The second touch module 50 is arranged on the upper front area of the electronic device 100. The first touch module 40 is arranged on the lower front area of the electronic device 100. According to embodiments of the present invention, the electronic device 100 may include the front, the rear, and sides, as shown in FIG. 6. The edges of the sides may be rounded.

The first touch module 40 includes the first rear touch area 46, the front touch area 43, the left side touch area 44, the right side touch area 45, and the second rear touch area 47. According to an embodiment, the front touch area 43 may be horizontally arranged at the lower end of the display panel of the electronic device 100 with a certain thickness. On the front touch area 43, the back key 122 and the menu key 123 may be arranged. Also, the home key 121 may be arranged on a certain part of the front touch area 43. The home key 121 may be a button key and may operate independently from the touch event of the front touch area 43.

According to an embodiment, the left touch area 44 is formed next to the front touch area 43 and may be arranged on a certain area of the left side of the electronic device 100.

The first rear touch area 46 is formed next to the left touch area 44 and is arranged on a certain area of the rear of the electronic device 100. According to embodiments of the present invention, the first rear touch area 46 is arranged on the left side of the rear of the electronic device 100.

According to an embodiment, the right touch area 45 is formed next to the front touch area 43 and may be arranged on a certain area of the right side of the electronic device 100. The second rear touch area 47 is formed next to the right touch area 45 and is arranged on a certain area of the rear of the electronic device 100. According to embodiments of the present invention, the second rear touch area 47 is arranged on the right side of the rear of the electronic device 100.

Although the touch areas arranged on the rear of the electronic device 100 are classified into the first rear touch area 46 and the second touch area 47 in the above descriptions, embodiments of the present invention are not limited thereto. For example, the first rear touch area 46 and the second rear touch area 47 may be connected to each other. Accordingly, the electronic device 100 may also have a touch area on the rear of the electronic device. When a touch area is provided on the rear, a corresponding rear touch area may be provided to be parallel to the front touch area 43. Accordingly, the electronic device 100 may also have a first touch module surrounding the front and rear of the electronic device, the first touch module having a band shape.

When a communication related event occurs, the first touch module 40 performs a detection function, and when a plurality of touch events occur together on the first rear touch area 46, the left touch area 44, the front touch area 43, the right touch area 45, and the second rear touch area 47 or a touch event occurs on a certain area, the control module 160 may determine that a specified event occurs. For example, the control module 160 may determine that the lower end of the electronic device 100 is in a grip state. When the specified event occurs, the control module 160 may activate an SAR decrease function.

According to embodiments of the present invention, the control module 160 may deactivate the first rear touch area 46, the left touch area 44, the right touch area 45, and the second rear touch area 47 when a communication related event does not occur. Alternatively, the control module 160 may recognize the first rear touch area 46, the left side touch area 44, the front touch area 43, and the second rear touch area 47 as an ineffective area. According to embodiments, when a communication related event does not occur, the control module 160 may activate only the back key 122 and the menu key 123 to be recognized as an touch-effective area and remaining areas to be recognized as an ineffective area. Accordingly, the control module 160 may inhibit unnecessary touch event occurrence or processing to be caused by gripping the electronic device 100 in the process of operating the electronic device 100.

According to embodiments of the present invention, the first touch module 40 may include at least one of the lower front touch area 43, the left touch area 44, the right touch area 45, the first rear touch area 46, and the second rear touch area 47.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An electronic device comprising:
a display;
a touch module including a first touch module disposed on a first area of the display and a second touch module disposed on a second area of the display;
a memory; and
a processor coupled to the memory, the display, and the touch module and configured to: supply a first operating frequency to the touch module of the electronic device for reception of a touch input by the touch module, and supply a second operating frequency to the touch module, instead of the first operating frequency, for detection of a specified event by the touch module, upon reception of a communication related event at the electronic device, the detection of the specified event triggering execution of a Specific Absorption Rate (SAR) decrease function,
wherein the specified event comprises at least one of a plurality of touch keys touched together and at least one touch key touched several times within a certain time period, and
wherein the processor is further configured to:
activate the first touch module to perform the detection of the specified event;
if the display is in a turn-off state when the communication related event is received, determine whether the specified event occurs on the first touch module while performing the detection of the specified event; and
activate the second touch module and maintain the turn-off state of the display when the specified event occurs, or
perform screen processing according to the communication related event occurrence when the specified event does not occur.

2. The electronic device according to claim 1, wherein the first touch module is arranged at a lower front end of the electronic device.

3. The electronic device according to claim 1, wherein the first touch module comprises a touch panel on which at least one touch key is arranged.

4. The electronic device according to claim 1, wherein the communication related event comprises at least one of a voice call connection request message reception event, a video call connection request message reception event, a voice call connection request message transmission event, and a video call connection request message transmission event.

5. The electronic device according to claim 1, wherein the processor is further configured to decrease an SAR when the specified event is detected, and the specified event further comprises a specified area of the touch module touched.

6. The electronic device according to claim 1, wherein the second operating frequency is lower than the first operating frequency.

7. The electronic device according to claim 1, wherein the processor is further configured to switch the touch module to a turn-off state, when the communication related event is released or a function performed by the communication related event is ended.

8. The electronic device according to claim 1, wherein the processor is further configured to change a first power of a communication module, receiving the communication related event, to a second power enabling detection of the specified event, when the touch module is enabled to detect the specified event.

9. The electronic device according to claim 8, wherein the second power also enables the processor to decrease an SAR.

10. The electronic device according to claim 8, wherein the second power is less than the first power.

11. The electronic device according to claim 8, wherein the processor is further configured to restore the first power of the communication module, when the specified event is not detected or the communication related event is released.

12. The electronic device according to claim 1, wherein the processor is further configured to:
enable the touch module to receive the touch input, when the communication related event is released or a function performed by the communication related event is ended.

13. The electronic device according to claim 1, wherein the first area comprises a front touch area on a front surface of the electronic device in which the touch module is arranged, a left touch area arranged adjacent to the front touch area and on a left side of the electronic device, and a right touch area arranged adjacent to the front touch area and on a right side of the electronic device,
wherein the front touch area, the left touch area, and the right touch area are able to recognize the touch input when the communication related event is received, and
wherein the left touch area and the right touch area are not able to recognize the touch input before the communication related event is received or when the communication related event is released.

14. A method of operating a touch module of an electronic device, the method comprising the steps of:
receiving a communication related event at the electronic device; and
switching the touch module from operation at a first operating frequency for reception of a touch input by the touch module to operation at a second operating frequency for detection of a specified input event by the touch module, upon reception of the communication related event, wherein the detection of the specified event triggers execution of a Specific Absorption Rate (SAR) decrease function,
wherein the specified event comprises at least one of a plurality of touch keys touched together and at least one touch key touched several times within a certain time period, and
wherein the switching the touch module further comprises activating a first touch module disposed on a first area of a display to perform the detection of a specified event:
if the display is in a turn-off state when the communication related event is received, determining whether the specified event occurs on the first touch module while performing the detection of the specified event; and
activating the second touch module disposed on a second area of the display and maintain the turn-off state of the display when the specified event occurs, or
performing screen processing according to the communication related event occurrence when the specified event does not occur.

15. The method according to claim 14, further comprising one of:
switching the touch module to operation at the first operating frequency when the specified event is released;
switching the touch module to operation at the first operating frequency when the communication related event is released or a function performed by the communication related event is ended; and
switching the touch module to a turn-off state when the communication related event is released or the function performed by the communication related event is ended.

16. The method according to claim 14, further comprising:
enabling, as touch-effective areas for detecting the specified event, the first area including at least one of a front touch area on a front surface of the electronic device in which the touch module is arranged, a left touch area arranged adjacent to the front touch area and on a left side of the electronic device, and a right touch area arranged adjacent to the front touch area and on a right side of the electronic device, when the communication related event is received,
wherein the left touch area and the right touch area are touch-ineffective areas before the communication related event is received or when the communication related event is released.

17. The method according to claim 16, wherein the touch-effective areas are able to recognize the touch input, and the touch in-effective areas are not able to recognize the touch input.

18. The method according to claim 14, further comprising displaying a notice of reception of the communication related event when the specified event is not received within a certain time period.

19. An article of manufacture for operating a touch module of an electronic device, comprising a machine readable medium containing one or more programs which when executed implement the steps of:
receiving a communication related event at the electronic device; and
switching the touch module from operation at a first operating frequency for reception of a touch input by the touch module to operation at a second operating frequency for detection of a specified input by the touch module, upon reception of the communication related event, wherein the detection of the specified event triggers execution of a Specific Absorption Rate (SAR) decrease function,
wherein the specified event comprises at least one of a plurality of touch keys touched together and at least one touch key touched several times within a certain time period, and
wherein switching the touch module further comprises:
activating a first touch module disposed on a first area of a display to perform the detection of a specified event;
if the display is in a turn-off state when the communication related event is received, determining whether the specified event occurs on the first touch module while performing the detection of the specified event; and
activating the second touch module disposed on a second area of the display and maintain the turn-off state of the display when the specified event occurs, or
performing screen processing according to the communication related event occurrence when the specified event does not occur.

* * * * *